United States Patent [19]

Hammarlind

[11] 3,715,561
[45] Feb. 6, 1973

[54] NON-CONSUMABLE ELECTRODE CONFIGURATION HAVING INCREASED ARC STARTING CAPABILITIES

[75] Inventor: Alf Martin Hammarlind, Vasteras, Sweden

[73] Assignee: Aktiebolaget Atomenergi, Stockholm, Sweden

[22] Filed: June 15, 1970

[21] Appl. No.: 46,045

[52] U.S. Cl. ..................... 219/145, 219/74, 219/75, 219/130
[51] Int. Cl. ............................................. B23k 35/00
[58] Field of Search........219/119, 145, 137, 136, 75, 219/74, 69 E

[56] References Cited

UNITED STATES PATENTS 2,751,482   6/1956   Stepath ................................. 219/70
2,025,206   12/1935   Holslag ............................ 219/145 X

FOREIGN PATENTS OR APPLICATIONS 1,486,084   5/1967   France ................................ 219/136
   91,417   4/1968   France ................................ 219/136

Primary Examiner—R. F. Staubly
Assistant Examiner—George A. Montanye
Attorney—Pierce, Scheffler & Parker

[57] ABSTRACT

There is disclosed a non-consumable electrode for electric arc welding in a highly controlled inert atmosphere. In order to improve the initiating characteristics the rod-shaped electrode has at least one longitudinal edge starting from the end of the rod facing the arc, the edge angle of at least one of said edges being acute.

4 Claims, 7 Drawing Figures

PATENTED FEB 6 1973

3,715,561

POWER SUPPLY

WORKPIECE — NON-CONSUMABLE ELECTRODE
SHIELDING GAS CHAMBER

NON-CONSUMABLE ELECTRODE CONFIGURATION HAVING INCREASED ARC STARTING CAPABILITIES

This invention relates to a non-consumable electric arc electrode, applicable to for instance electrical (DC or AC) arc welding, arc heating or arc lighting, and more particularly to electrical arc welding in a chamber having a highly controlled atmosphere. Although not limited thereto, the invention will hereinafter be particularly described in connection with TIG-welding.

In TIG-welding, (TIG= Tungsten Inert Gas) i.e. arc welding in an insert atmosphere by means of a non-consumable electrode, usually of wolfram, it is important that the arc can be initiated positively and instantaneously. To facilitate the striking or initiation of the arc without having the electrode to touch the workpiece, a high-frequency and high-voltage initiating current is superimposed on the welding current. In normal TIG-manual welding the initiation is no problem as the technique of manual welding includes approaching the electrode to the workpiece at the moment of initiation, until the arc strikes. However, in machine TIG-welding, where the distance between the electrode and the workpiece is fixed, initiating problems exist. In TIG-welding of reactive metals, such as zirconium and titanium and their alloys, in a welding chamber, in which the electrode is completely surrounded by a highly purified inert gas, the initiating problems are remarkable even when the above-mentioned technique of manual welding is used.

The initiating problems manifest themselves in uncertain or non-instantaneous initiations, in initiations in an unforeseen direction, i.e. not in the direction of the axis of the electrode, or in no initiation at all. Also, there might appear a voluminous glowing cloud, "a corona effect," which heats unintended parts of the workpiece and/or pass over onto the electrode holder to which the electrode is attached, from which solid particles or sorbed gases are set free, said particles or gases contaminating the workpiece.

In TIG-welding in a welding chamber the following attempts have been previously made in order to solve said initiating problems:

a. The initiating voltage has been increased. This step gives an inconsiderable improvement.

b. The electrode has been provided with a close fitting quartz tube, the length of which being adjusted to have only about 2 mm of the end of the electrode exposed. The purpose of the quartz tube was to prevent said "corona effect" from moving upwards on the electrode and from wander over onto other parts of the electrode holder. This gives a clear improvement, especially in combination with a pointing of the electrode. However, this step gives no complete solution since the initiating problems will, nevertheless, appear again rather frequently;

the pointed end of the electrode will be rapidly blunted, this giving a deterioration of the initiation;

the quartz tube will contribute in contaminating the weld due to its low boiling point in relation to the temperature of the arc.

c. A high voltage — cold cathode discharge device (for instance a Penning vacuum measuring tube) has been used in order to facilitate the initiation by an ionization of the inert gas. Sometimes, the outcome of using this device has been satisfactory, sometimes it has been a complete failure and, consequently, said device is not reliable.

Thus, no one of said steps gives a satisfactory result. Accordingly, it is main object of this invention to provide a novel and improved electrode by which said initiating problems are overcome. According to the invention the electrode has the shape of a rod, the part of which facing the arc has at least one longitudinal edge formed between two contiguous longitudinally extending surfaces starting from the end of the rod, the electrode being characterized in that the edge angle of at least one of said edges is acute, i.e., < 90°, preferably about 60°.

A preferred embodiment of the electrode according to the invention is characterized in that each cross section of said part has the shape of an equilateral triangle.

A further embodiment of the electrode according to the invention is characterized in that each cross section of said part has the shape of a regular figure having four angles, said angles being connected by concave lines.

Said part of the rod facing the arc can be tapered towards the end of the rod. Possibly, said part can be pointed.

The electrode according to the invention will be more fully described in the following specification in conjunction with the accompanying drawings, in which.

Figure 1:
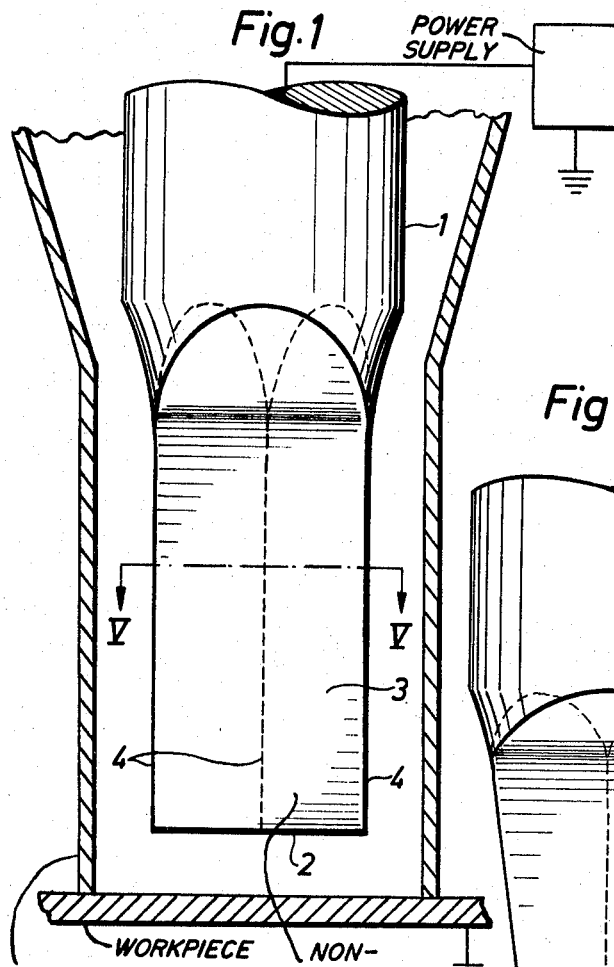
FIG. 1 is a side view of a preferred embodiment of the electrode according to the invention.
Figure 2:
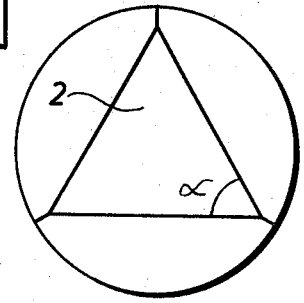
FIG. 2 is a bottom plan view of the electrode illustrated in FIG. 1.

Referring to FIGS. 1 and 2, the end part of a preferred electrode according to the invention is illustrated. The rod-shaped electrode has a cylindrical body 1, the part 3 of which facing the workpiece has been ground, each cross section of said part having the shape of a equilateral triangle (cf. FIG. 5). Thus, said part 3 shows three longitudinal edges 4 starting from the end 2 of the electrode. The edge angles α of the edges are 60°. The end 2 of the electrode has been ground flat. The other end of the electrode (not shown) is adapted to be attached to an electrode holder and to be connected to one terminal of a current source, the other terminal of which is connected to the workpiece.

Figure 3:
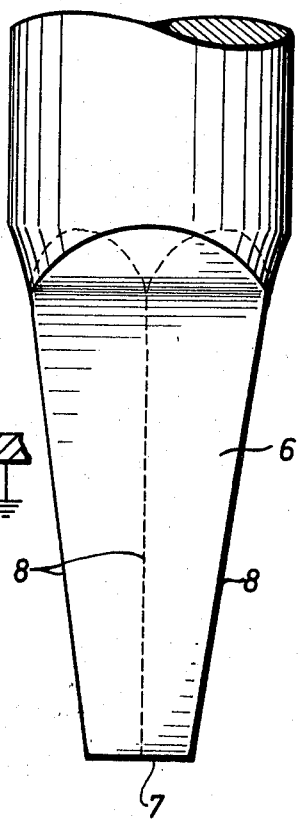
FIG. 3 is a side view of an electrode according to FIG. 1 which has been tapered towards the end of the electrode.
Figure 4:
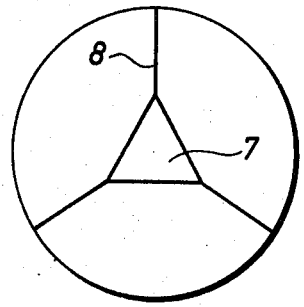
FIG. 4 is a bottom plan view of the electrode illustrated in FIG. 3.

Referring now to FIGS. 3 and 4, a modified embodiment of the electrode according to FIG. 1 is illustrated.

The electrode according to FIGS. 3 and 4 has a part 6 tapering towards the end 7, said part also showing three longitudinal edges 8.

Figure 5:
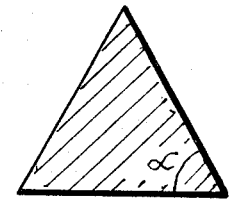
FIG. 5 is a cross sectional view of the electrode illustrated in FIG. 1 taken along the line V—V.

FIG. 5 shows a cross sectional view of the electrode according to FIG. 1 taken along the line V—V and illustrating the edge angle α.

Figure 6:
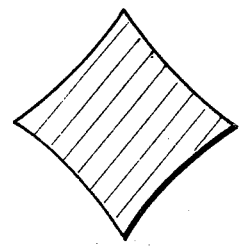
FIGS. 6 and 7 are cross sectional views illustrating other embodiments of the electrode according to the invention.
Figure 7:
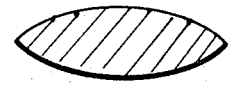

Referring now to FIGS. 6 and 7, other possible cross sections of electrodes according to the invention are illustrated. An electrode having a cross section according to FIG. 6 shows four concave sides, while an electrode having a cross section according to FIG. 7 shows two convex sides. Thus, the electrodes have four and two longitudinal edges, respectively.

Comparative tests have been made during normal operation between on one hand an electrode according to the invention having three edges, i.e. a pointed electrode according to FIG. 3, and on the other hand a conventional cylindric and conically pointed electrode. The tests were carried out on a workpiece requiring a great number of very short welds, i.e. a great number of initiations. For each type of electrode the number of correct initiations were counted up to the point where initiating problems of the above-mentioned nature appeared. The cylindric and conically pointed electrode gave about 80 correct initiations before any problems appeared, while the electrode according to the invention after 800 initiations was still operating without failure. In this connection it was observed that if the point of the electrode was blunted or broken the excellent initiating characteristics of the electrode according to the invention were not influenced.

Further, welding tests have been carried out using electrodes according to the invention having other cross sections than equilateral triangles and using known electrodes having spaded or chisel end parts. Although the latter show some longitudinal edges, the edge angles are always obtuse. Besides, these known electrodes have not been given said spaded or chisel shape giving longitudinal edges to improve the initiating characteristics, but to imply a reduction of the cross section and to increase the current density of the arc and to make it possible to increase the welding speed during continuous welding by holding the edge of the electrode parallel to the longitudinal direction of the weld.

During all these tests the operating conditions were the following:

The welding chamber was a sealed metal chamber initially evacuated to a pressure of $10^{-4}$ torr after which highly purified argon was supplied until pressure equalization had occurred. The electrodes consisted of wolfram with 2 percent thorium oxide, having a diameter of 1.6 mm before grinding. The voltage source was a DC welding set giving an open circuit voltage of 80V and a current strength of 80 A. The electrode was connected to the negative terminal of the voltage source. The distance between the electrode and the workpiece was about 1 mm. These operational data are merely exemplifying and are to be considered non-limiting. Thus, it is possible to use, instead of argon, other inert gases, such as helium.

The tests indicated that a chisel-shaped electrode gave considerable fewer correct initiations than a conventional, conically pointed electrode. The arc showed a clear tendency to move all the way up to the electrode holder.

Furthermore, it could be seen that an electrode having four edges and a square cross section did not give any striking at all. However, an electrode according to FIG. 6 gave substantially the same efficiency as an electrode having a cross section in the shape of an equilateral triangle, the excellent results of which have been mentioned above.

Thus, the electrode according to the invention implies extraordinarily initiating characteristics. The initiation or striking will be reliable and will take place in a correct direction. Further, the arc will be stable and will not move upwards on the electrode or wander off onto adjacent parts of the workpiece. This is most important, when the workpiece includes a number of upstanding parts between which the welding electrode has to be lowered.

Furthermore, the electrode according to the invention involves the advantage that its excellent characteristics will not be deteriorated in any degree worth mentioning if the electrode is broken or its lower end facing the workpiece is damaged.

Obviously, the invention is not limited to the embodiments described, but changes and modifications can be made without departing from the invention idea. Thus, the electrodes can have other cross sections than those illustrated and the electrodes can consist of other suitable materials or combinations of materials than wolfram and thorium oxide. Also, the electrodes can have longitudinal edges over their entire length.

I claim:

1. In an inert gas arc welding apparatus including a sealed welding chamber filled with an inert gas, the workpiece to be welded being arranged in said chamber and connected to one terminal of a voltage source, an electrode holder arranged in said chamber and connected to the other terminal of the voltage source, and a non-consumable electrode mounted in said electrode holder so that the electrode does not touch the workpiece, the improvement wherein the electrode has the shape of a rod with an elongated body, said body having a first end portion having an extreme end facing the workpiece and a second end portion attached to the electrode holder so that an arc can be struck between the extreme end of said first end portion and the workpiece, said first end portion having at least one edge formed between two contiguous longitudinally extending surfaces formed by a portion of said rod elongated body and starting from said extreme end and extending along the length of the first end portion, the edge angle formed by the two surfaces diverging from the edge being essentially less than 90°, each cross-section of said first end portion having the shape of an equilateral triangle, whereby the initiating characteristics are improved.

2. In an inert gas arc welding apparatus including a sealed welding chamber filled with an inert gas, the workpiece to be welded being arranged in said chamber and connected to one terminal of a voltage source, an electrode holder arranged in said chamber and connected to the other terminal of the voltage source, and a non-consumable electrode mounted in said electrode holder so that the electrode does not touch the workpiece, the improvement wherein the electrode has the shape of a rod with an elongated body, said body having a first end portion having an extreme end facing the workpiece and a second end portion attached to the electrode holder so that an arc can be struck between the extreme end of said first end portion and the workpiece, said first end portion having at least one edge formed between two contiguous longitudinally extending surfaces formed by a portion of said rod elongated body and starting from said extreme end and extending along the length of the first end portion, the edge angle formed by the two surfaces diverging from the edge being essentially less than 90°, each cross-section of said first end portion having the shape of a regular figure having four angles connected by concave lines, whereby the initiating characteristics are improved.

3. The apparatus of claim 2 wherein the at least one edge angle formed by two surfaces diverging from the edge is about 60°.

4. In an inert gas arc welding apparatus including a sealed welding chamber filled with an inert gas, the workpiece to be welded being arranged in said chamber and connected to one terminal of a voltage source, an electrode holder arranged in said chamber and connected to the other terminal of the voltage source, and a non-consumable electrode mounted in said electrode holder so that the electrode does not touch the workpiece, the improvement wherein the electrode has the shape of a rod with an elongated body, said body having a first end portion having an extreme end facing the workpiece and a second end portion attached to the electrode holder so that an arc can be struck between the extreme end of said first end portion and the workpiece, said first end portion having at least one edge formed between two contiguous longitudinally extending surfaces formed by a portion of said rod elongated body and starting from said extreme end and extending along the length of the first end portion, each cross-section of said first end having a triangular shape with angles of about 60°, whereby the initiating characteristics are improved.

* * * * *